(12) United States Patent
Sassi et al.

(10) Patent No.: US 6,513,377 B1
(45) Date of Patent: Feb. 4, 2003

(54) BOILER LEVEL INDICATOR

(75) Inventors: Virginio Sassi, Moncalieri (IT); Stefano Sassi, Moncalieri (IT)

(73) Assignee: R.E.A. S.n.c. Di Sassi Baudin & C., Trofarello (IT)

( * ) Notice: Subject to any disclaimer, the term of this patent is extended or adjusted under 35 U.S.C. 154(b) by 0 days.

(21) Appl. No.: 09/541,992

(22) Filed: Apr. 3, 2000

(51) Int. Cl.$^7$ .......................... G01F 23/30; G01F 23/00; H01B 9/02
(52) U.S. Cl. ................ 73/304 R; 73/290 R; 174/102 R
(58) Field of Search .............................. 73/304 R, 1 H, 73/31.05, 290 R; 174/102 R, 102

(56) References Cited

U.S. PATENT DOCUMENTS

| | | | | |
|---|---|---|---|---|
| 2,797,284 A | * | 6/1957 | Brooke | 73/304 R |
| 3,170,479 A | * | 2/1965 | Mueller | 73/304 R |
| 4,056,978 A | * | 11/1977 | Zimmermann | 73/304 R |
| 4,196,624 A | * | 4/1980 | Willenbrock et al. | 73/304 R |
| 4,714,189 A | * | 12/1987 | Tovey | 73/304 R |
| 4,879,902 A | * | 11/1989 | Loniello | 73/304 R |
| 5,886,248 A | * | 3/1999 | Paulus et al. | 73/31.05 |

* cited by examiner

*Primary Examiner*—Hezron Williams
*Assistant Examiner*—Katina Wilson
(74) *Attorney, Agent, or Firm*—Paul & Paul

(57) ABSTRACT

Level indicator for controlling the levels in a boiler or similar, comprising two conductive material rods, inserted in a single insulating material mold body, suitable for withstanding high pressures and temperatures, said rods protruding at different heights from the body; said insulating body being applied to a single hole of the boiler or tank in which the minimum and maximum level is to be monitored.

23 Claims, 2 Drawing Sheets

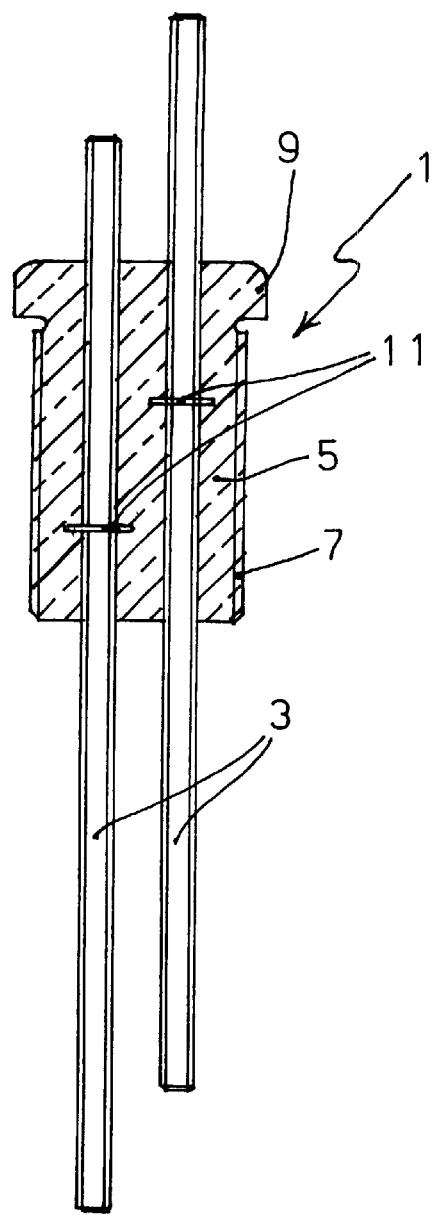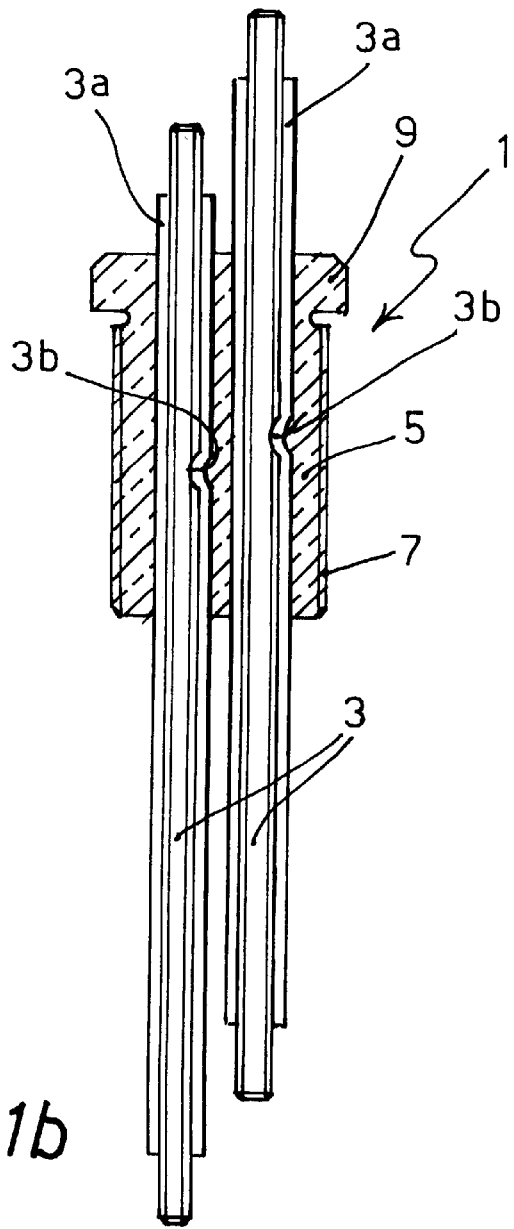
FIG. 1a
FIG. 1b

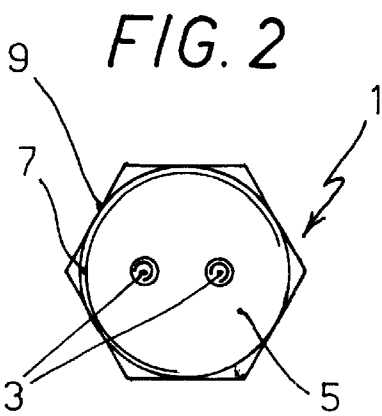
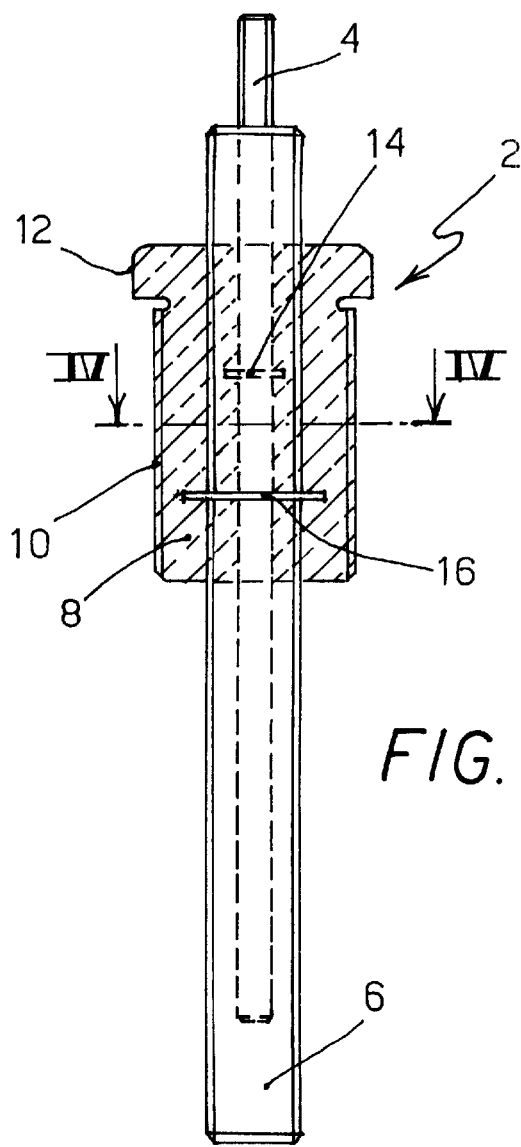
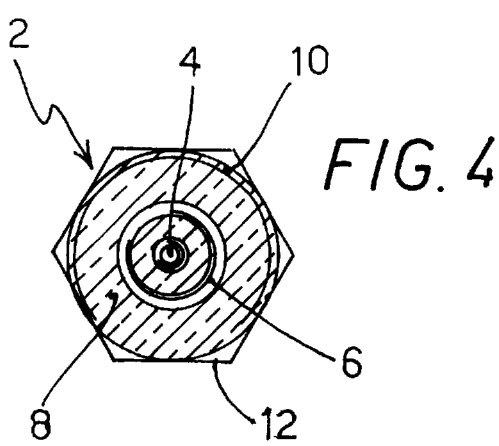

BOILER LEVEL INDICATOR

TECHNICAL FIELD

The present invention relates to a level indicator for a boiler, in particular for an intensive use in the boiler, without any aid, and suitable for use at particularly high pressures and temperatures.

BACKGROUND ART

It is well known that at present the available level indicators generally consist of a central rod, inserted in an insulating material body, as teflon or ceramic; said body being normally made of two parts, a male part and a female part, which can be joined by interposition of a suitable sealing ring, as an o-ring or similar.

The use of this kind of level indicators is limited by its structure, and moreover by the fact that they are generally used for generic applications.

Moreover is to be considered the fact that, in order to sense the maximum and minimum levels in a boiler or similar, it is necessary to use two level indicators, and to make flanges or several holes for assembling them in the boiler or similar, limiting furthermore the use of said level indicators in small or mass-produce.

SUMMARY OF THE INVENTION

The object of the present invention is to overcome said drawbacks, providing a level indicator that, thanks to its small size, reduces the space necessary for its installation in the boiler, reducing production costs, and that can be used in small and mass-produce, and that can be used at medium-high pressures or temperatures.

The level indicator according to the present invention consists of two conductive material rods, for instance made of stainless steel, inserted into a single insulating material mold body, in particular a pressure and heat-resistant material, and protruding at different heights from said body; said insulating body, having reduced dimensions, being applied to a single hole of the boiler or tank in which the minimum and maximum level is to be monitored.

According to another embodiment, the level indicator consists of two coaxial rods, protruding at different heights from the insulating material body in which are inserted; said body being applied to a single hole of the boiler or tank in which the minimum and maximum level is to be monitored.

BRIEF DESCRIPTION OF THE DRAWINGS

The invention will now be disclosed in details with particular reference to the attached drawings illustrating only exemplary and non-limiting embodiments thereof, in which:

FIGS. 1a and 1b are axial sectional views of the level indicator of the present invention, according to a first and to a second embodiment;

FIG. 2 is a plan view of the level indicator of FIG. 1a;

FIG. 3 is a view of an axial section of the level indicator of the present invention according to a third embodiment; and FIG. 4 is a cross section of the level indicator of FIG. 2.

DETAILED DESCRIPTION OF THE INVENTION

As shown in FIGS. 1a and 2, the level indicator according to the first embodiment, referenced as 1, consists of two conductive material rods 3, inserted into a single insulating material block 5.

In particular, in the shown embodiment, said conductive material is stainless steel, and the insulating material is preferably teflon or ceramic.

Said stainless steel rods 3 protrudes from the insulating material block 5 at different heights, a first one for revealing the minimum level of the liquid contained in the tank or boiler, and a second one for revealing the maximum level of the liquid.

The block 5 in the shown embodiment is provided with a threaded cylindrical surface 7, adapted to be inserted in a suitable hole (not shown) of the boiler or similar and to be locked in place by means of an hexagonal nut 9.

The rods 3 are as well provided threaded on the external surface; into the insulating material 5 are provided two metal rings 11, one for each rod, as ring-nuts, in order to strengthen the coupling between said rods and the material 5.

It is evident that using such a level indicator, easily applicable to a boiler or a tank, the two levels of the liquid can be easily controlled, the minimum and the maximum, using a single, small, instrument.

With reference to FIG. 1b it is shown a second embodiment of the level indicator 1 in which the two conductive material rods 3 are coated by a layer 3a of insulating material, preferably different from that of the block 5, for example teflon.

The coating 3a is discontinued on the two opposite ends of the rods 3 in order to leave uncovered the terminal portion of said rods 3.

According to this embodiment, the rods 3 are moreover provided with a flattened portion 3b used for strengthening the coupling between the rods 3 and the block 5.

Advantageously, according to this embodiment of the invention, the risk of ground leakage through the block 5 itself is reduced and are reduced also the risks of false signals due to the boiling of the water surface.

In FIGS. 3 and 4 it is shown another embodiment, wherein the level indicator 2 consists of two coaxial rods 4 and 6, protruding as well at different heights from the insulating material body 8 in which are inserted.

Said insulating body 8, as well as the body 5 of the first embodiment shown in FIG. 1a and 2, is provided with a threaded cylindrical surface 10, adapted to be inserted into the suitable hole (not shown) of the boiler or similar and to be locked in place by means of an hexagonal nut 12.

The rods 4 and 6 are as well provided threaded on the external surface; into the insulating material 8 are provided two metal rings 14, 16, one for each rod, as ring-nuts, in order to strengthen the coupling between said rods and the material 8.

As regards the operation and the positioning of the level indicator according to this third embodiment, are valid the same considerations made for the first and the second embodiments shown in FIGS. 1a, 1b and 2.

What is claimed is:

1. Level indicator for controlling the levels in a boiler or tank, comprising:

a body member, comprised of a single-piece insulating material mold body, to be applied to a single hole of the boiler or tank in which the minimum and maximum level is to be monitored, said body being suitable for withstanding high pressures and temperatures; and two conductive material rods, partially sunk into said insulating material mold body, protruding at different heights from an upper end of the body in which said rods are inserted, each of said rods being provided, on the external surface in contact with said body, with a projection or a recess in order to strengthen coupling between said rods and the material of the body, wherein the coupling provides for a seal between the conductive material rods and the body so as to prevent the escape of the contents of the boiler or tank at the seal.

2. Level indicator according to claim 1, wherein the rods are made of stainless steel, hollow and externally threaded.

3. Level indicator according to claim 1, wherein said projection provided on each rod is a metal ring, integral with said rod, sunk into the insulating material of said body.

4. Level indicator according to claim 3, wherein the conductive material rods which protrudes from the insulating material body are coaxial.

5. Level indicator according to claim 4, wherein the rods are made of stainless steel, and the insulating material of the body is a plastic material, polytetrafluoroethylene, or a ceramic material, depending on said temperature.

6. Level indicator according to claim 5, wherein the insulating material body has a threaded cylindrical surface provided with a hexagonal nut, so that it can be fixed by screwing to the boiler.

7. Level indicator according to claim 1, wherein said recess provided on each rod is a flattened portion, sunk into the insulating material of said body.

8. Level indicator according to claim 1, wherein the rods are coated by a layer of insulating material discontinued on the two opposite ends of the rods in order to leave uncovered the terminal portion of said rods.

9. Level indicator according to claim 8, wherein said layer of insulating material is a layer of polytetrafluoroethylene.

10. Level indicator according to claim 1, wherein the insulating material of the body is a plastic material, polytetrafluoroethylene, or a ceramic material, depending on said temperature.

11. Level indicator according to claim 1, wherein the insulating material body has a threaded cylindrical surface provided with a hexagonal nut, so that it can be fixed by screwing to the boiler.

12. A level indicator for controlling the liquid level in a boiler or tank, comprising:

a body member, comprised of a single-piece insulating material molded body having an upper and a lower end, with the lower end having means thereon adapted to be applied to a single hole of a boiler or tank in which minimum and maximum liquid levels are to be monitored, said body being suitable for withstanding high pressures and temperatures; and two conductive material rods, partially sunk into said insulating material molded body, protruding above the upper end of the body at different heights from the body in which they are inserted and comprising first and second means for revealing, respectively, minimum and maximum levels of liquid in the boiler or tank in which the level indicator is inserted, each of said rods being provided, on the external surface in contact with said body, with a projection or a recess in order to strengthen coupling between said rods and the material of the body wherein the coupling provides for a seal between the conductive material rods and the body so as to prevent the escape of the contents of the boiler or tank at the seal.

13. A level indicator according to claim 12, wherein the rods are made of stainless steel and are hollow and externally threaded.

14. A level indicator according to claim 12, wherein said projection provided on each rod is a metal ring, integral with said rod, sunk into the insulating material of said body.

15. A level indicator according to claim 14, wherein the conductive material rods which protrude from the insulating material body are coaxial.

16. A level indicator according to claim 15, wherein the rods are made of stainless steel, and the insulating material of the body is a plastic material, polytetrafluoroethylene, or a ceramic material, depending on the operating temperature.

17. A level indicator according to claim 16, wherein the insulating material body has a threaded cylindrical surface provided with a hexagonal nut, so that it can be fixed by screwing to the boiler.

18. A level indicator according to claim 12, wherein said recess provided on each rod is a flattened portion, sunk into the insulating material of said body.

19. A level indicator according to claim 12, wherein the rods are coated by a layer of insulating material discontinued on the two opposite ends of the rods in order to leave uncovered the terminal portions of said rods.

20. A level indicator according to claim 19, wherein said layer of insulating material is a layer of polytetrafluoroethylene.

21. A level indicator according to claim 12, wherein the insulating material of the body is a plastic material, polytetrafluoroethylene, or a ceramic material, depending on the operating temperature.

22. A level indicator according to claim 12, wherein the insulating material body has a threaded cylindrical surface provided with a hexagonal nut, so that it can be fixed by screwing to the boiler or tank.

23. A level indicator according to claim 12, wherein the conductive rods extend below the lower end of the body, at different amounts from the body in which they are inserted, corresponding respectively, to minimum and maximum levels of liquid in the boiler or tank in which the level indicator is inserted.

* * * * *